United States Patent
Lopez et al.

(10) Patent No.: US 7,776,781 B2
(45) Date of Patent: Aug. 17, 2010

(54) PLATINUM/RUTHENIUM CATALYST FOR DIRECT METHANOL FUEL CELLS

(75) Inventors: Marco Lopez, Frankfurt (DE); Peter Biberbach, Rodenbach (DE)

(73) Assignee: Umicore AG & Co. KG, Hanau-Wolfgang (DE)

(*) Notice: Subject to any disclaimer, the term of this patent is extended or adjusted under 35 U.S.C. 154(b) by 279 days.

(21) Appl. No.: 11/573,936

(22) PCT Filed: Aug. 13, 2005

(86) PCT No.: PCT/EP2005/008827
§ 371 (c)(1),
(2), (4) Date: Oct. 12, 2007

(87) PCT Pub. No.: WO2006/018257
PCT Pub. Date: Feb. 23, 2006

(65) Prior Publication Data
US 2008/0214389 A1  Sep. 4, 2008

(30) Foreign Application Priority Data
Aug. 20, 2004 (EP) .................... 04019813

(51) Int. Cl.
| | |
|---|---|
| *B01J 21/18* | (2006.01) |
| *B01J 23/40* | (2006.01) |
| *B01J 23/74* | (2006.01) |
| *B01J 23/00* | (2006.01) |
| *B01J 23/42* | (2006.01) |
| *B01J 23/44* | (2006.01) |
| *H01M 4/02* | (2006.01) |
| *H01M 4/58* | (2006.01) |
| *C22C 5/04* | (2006.01) |

(52) U.S. Cl. ................ 502/185; 502/325; 502/339; 420/462; 420/466; 429/40; 429/209; 429/218.1

(58) Field of Classification Search .......... 502/185, 502/325, 339; 420/462, 466; 429/40, 209, 429/218.1
See application file for complete search history.

(56) References Cited

U.S. PATENT DOCUMENTS

| 4,425,261 | A  | * | 1/1984  | Stenius et al. ........... 502/339 |
| 6,518,217 | B2 | * | 2/2003  | Xing et al. ............. 502/230 |
| 6,670,301 | B2 | * | 12/2003 | Adzic et al. ............ 502/185 |
| 6,797,667 | B2 | * | 9/2004  | Ruth et al. ............. 502/182 |
| 7,001,865 | B2 | * | 2/2006  | Tada et al. ............. 502/185 |
| 7,037,873 | B2 | * | 5/2006  | Kato ..................... 502/180 |
| 7,205,255 | B2 | * | 4/2007  | Yamamoto ............... 502/101 |
| 7,432,221 | B2 | * | 10/2008 | Kim et al. .............. 502/185 |
| 7,479,469 | B2 | * | 1/2009  | Ishihara et al. ......... 502/185 |

FOREIGN PATENT DOCUMENTS

| DE | 103 25 324 A1   | 12/2004 |
| EP | 0 880 188 A2    | 11/1998 |
| EP | 0 924 784 A1    | 6/1999  |
| EP | 0 952 241 A1    | 10/1999 |
| EP | 1 037 295 A1    | 9/2000  |
| EP | 1 176 652 A2    | 1/2002  |
| EP | 1 260 269 A1    | 11/2002 |
| EP | 1 278 260 A1    | 1/2003  |
| EP | 1 320 140 A1    | 6/2003  |
| WO | WO 2004/036678 A1 | 4/2004 |

* cited by examiner

*Primary Examiner*—Patricia L Hailey
(74) *Attorney, Agent, or Firm*—Smith, Gambrell & Russell, LLP

(57) ABSTRACT

The invention relates to a carbon-supported PtRu anode catalyst for direct methanol fuel cells (DMFC) which has a platinum/ruthenium content in the range from 80 to 98 wt. %, preferably in the range from 85 to 98 wt. %, particularly preferably in the range from 85 to 95 wt. % (based on the total weight of the catalyst), on a carbon-based electrically conductive support material and has a mean particle size of less than 3 nm. The catalyst is prepared using a carbon black support material having a specific surface area (measured by the BET method) in the range from 1000 to 2000 $m^2/g$ by means of a reduction process using chemical reducing agents with addition of organic acids. Electrodes and membrane-electrode units containing the catalyst according to the invention having a high precious metal loading have an electrode layer thickness of less than 80 μm at a PtRu loading per unit area of the electrode of from 6 to 12 mg of $PtRu/cm^2$ and lead to improved electric power in direct methanol fuel cells.

18 Claims, No Drawings

PLATINUM/RUTHENIUM CATALYST FOR DIRECT METHANOL FUEL CELLS

CROSS-REFERENCE TO RELATED APPLICATIONS

This application claims the benefit of priority of European Application No. 04019813.7 filed Aug. 20, 2004, and International Application No. PCT/EP2005/008827 filed Aug. 13, 2005, which are relied on and incorporated herein by reference.

INTRODUCTION AND BACKGROUND

The invention relates to a catalyst for fuel cells, in particular to a carbon-supported anode catalyst based on platinum/ruthenium for direct methanol fuel cells (DMFC).

Fuel cells convert a fuel and an oxidant in separate locations at two electrodes into electric power, heat and water. The fuel used can be hydrogen, methanol or a hydrogen-rich gas, and the oxidant can be oxygen or air. The energy conversion process in the fuel cell is largely free of pollutants and has a particularly high efficiency. For this reason, fuel cells are becoming increasingly important for alternative propulsion concepts, domestic energy supply plants and portable applications. The direct methanol fuel cell (DMFC) converts the fuel methanol directly into electric energy. Owing to its low operating temperature, its compact construction and its power density, it is particularly suitable for portable applications, e.g. as replacement for accumulators and batteries.

PEM fuel cells and DMFCs are made up of a stack of many fuel cell units. These are electrically connected in series to increase the operating voltage. With regard to the structure and mode of operation of fuel cells, reference may be made to the relevant literature (e.g. K. Kordesch, G. Simader, "Fuel Cells and its Applications", VCH-Verlag Chemie, Weinheim 1996).

The key component of a PEM fuel cell or DMFC is the Membrane-Electrode-Unit (MEU). The MEU generally comprises five layers, viz. the proton-conducting membrane (polymer electrolyte membrane or ionomer membrane), the two gas diffusion layers (GDLs or "backings") on the sides of the membrane and the two electrode layers located between membrane and gas diffusion layers. One of the electrode layers is configured as anode for the oxidation of methanol and the second electrode layer is configured as cathode for the reduction of oxygen. The gas diffusion layers (GDLs) usually comprise carbon fibre paper or woven carbon fibre fabric and make it possible for the reactants to get to the reaction layers readily and allow the cell current and the water formed to be conducted away readily.

In the DMFC, methanol (or an aqueous methanol solution) is converted directly into $CO_2$, water and electric current. This is referred to as a "liquid feed" arrangement. The corresponding reactions are:

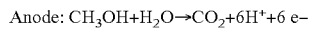

Anode: $CH_3OH + H_2O \rightarrow CO_2 + 6H^+ + 6 e-$

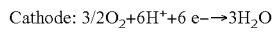

Cathode: $3/2 O_2 + 6H^+ + 6 e- \rightarrow 3H_2O$

Overall reaction: $CH_3OH + 3/2\ O_2 \rightarrow CO_2 + 2H_2O$

The electrode layers for the anode and cathode of the DMFC comprise a proton-conducting polymer and electrocatalysts which catalyse the respective reaction (oxidation of methanol or reduction of oxygen). A bimetallic platinum/ruthenium catalyst is preferably used as catalytically active component on the anode, and a platinum catalyst is preferably used on the cathode side. Use is made mainly of supported catalysts in which the catalytically active precious metals have been applied in finely divided form to the surface of a conductive, carbon-based support material, for example carbon black or graphite. However, it is also possible to use Pt and/or PtRu powders (known as precious metal blacks).

The peak power density achieved at present in DMFCs is still too low for practical applications. The great challenges in the development of the technology are therefore improvement of the power density, prevention of the methanol transport through the membrane to the cathode side ("MeOH crossover") and reduction of the usage of catalyst containing precious metals, in particular PtRu catalyst on the anode side.

The present invention is concerned with high-loading, supported platinum/ruthenium (PtRu/C) catalysts for use as anode catalysts for direct methanol fuel cells (DMFCs). These high-loading supported catalysts are used in the form of catalyst inks for producing electrodes and membrane-electrode units and lead to a significant improvement in performance of the DMFC.

Electrocatalysts supported on carbon black and having up to 90 wt. % of PtRu on the support material have been described by K. A. Friedrich et al. in "Journal of Electroanal. Chemistry", Volume 524-525 (2002), pages 261-272. They are prepared by the "sulfito method" and the particle sizes of these catalysts prepared in this way are about 6 nm (measured by means of XRD).

EP 952 241 B1 describes PtRu catalysts having a PtRu content of from 10 to 80 wt. % on the carbon black support material, while the patents EP 880 188 B1 and EP 924 784 B1 disclose PtRu electrocatalysts having PtRu contents of from 10 to 40 wt. % or from 10 to 50 wt. % (in each case based on the total weight of the catalyst).

Furthermore, EP 1 260 269 A1 discloses a process for preparing PtRu catalysts which have a precious metal content of from 10 to 80 wt. % and are used in PEM fuel cells.

A person skilled in the art will know that high precious metal contents (i.e. contents above 60 wt. % based on the total weight of the catalyst) lead to coarsening of the catalyst particles and thus to a lower catalytically active catalyst surface area. Furthermore, a poor, non-uniform distribution of the precious metal particles on the carbon black support is obtained, resulting in a drop in the utilization of the catalyst. All these factors finally have an adverse effect on the electric power of the fuel cell. Supported catalysts which have been prepared by conventional methods generally have relatively coarse particles (i.e. particles having a mean particle size measured by XRD of significantly above 3 nm) at precious metal contents of above 60 wt. % of PtRu and therefore suffer from the disadvantages indicated.

SUMMARY OF THE INVENTION

It was therefore an object of the present invention to provide a high-loading PtRu/C catalyst on a carbon-based support material which, despite its high precious metal contents, has a mean particle size (determined by XRD) of less than 3 nm.

It should at the same time have a high catalytically active precious metal surface area ("dispersion"), display very good performance in the anodic oxidation of methanol and accordingly overcome the disadvantages of the previous supported and unsupported PtRu catalyst systems.

This object is achieved by a platinum/ruthenium catalyst for the anodic oxidation of methanol in direct methanol fuel cells, wherein the platinum/ruthenium content is in the range from 80 to 98 wt.% (based on the total weight of the catalyst)

on a carbon-based support material and wherein the mean particle size of the precious metal particles (measured by XRD method) is less than 3 nm. Advantageous embodiments and also the process for preparing the catalyst of the invention are described herein. The invention further relates to an electrode containing the catalyst of the invention and to membrane-electrode units (MEUs) produced herewith.

In an earlier patent application by the applicant (EP 1 260 269 A1), a process for preparing PtRu/C catalysts having a precious metal content of from 10 to 80 wt. % is described. The mean particle size of the PtRu particles after calcination is 5.7 nm (for 40 wt. % PtRu/C, Example 1) and 6.7 nm (for 60 wt. % PtRu/C, Example 2). Support carbon blacks having a specific surface area (measured by the BET method) of about 250 m$^2$/g are used here.

It has now surprisingly been found that high-loading supported PtRu catalysts which have precious metal contents in the range from 80 to 98 wt. %, preferably in the range from 85 to 98 wt. % and particularly preferably in the range from 85 to 95 wt. %, and at the same time have a mean particle size of less than 3 nm are also obtainable on the basis of the process described in EP 1 260 269 A1. These catalysts display very good properties as anode catalysts for the DMFC.

For this purpose, the process of EP 1 260 269 A1 has to be carried out using a conductive carbon black having a BET surface area in the range from 1000 to 2000 m$^2$/g, preferably in the range from 1200 to 1600 m$^2$/g. Preferred carbon-based, electrically conductive support materials are carbon blacks, furnace blacks, graphitized carbon blacks, graphites, activated carbons, carbon nanoparticles, carbon nanotubes, carbon fibres and mixtures or combinations of these materials. Particularly preferred carbon blacks are "Ketjenblack" from Akzo (Amersfoort, The Netherlands) or "Black Pearls" from Cabot (Billerica, Mass., USA). Carbon blacks having BET surface areas of less than 1000 m$^2$/g do not lead to the desired small precious metal particle size and are unsuitable for use.

DETAILED DESCRIPTION OF THE INVENTION

To prepare the platinum/ruthenium catalyst of the invention, the support material is suspended in water. The suspension is then heated to from 70 to 90° C. while stirring continually. After the desired temperature has been reached, aqueous solutions of hexachloroplatinic(IV) acid and ruthenium(III) chloride are added to the suspension in amounts corresponding to the desired loading of the support material with the precious metals. The pH of the suspension is subsequently increased to a value in the range from 6.5 to 10 by addition of an alkali metal hydroxide so as to precipitate hexachloroplatinic(IV) acid and ruthenium(III) chloride in the form of sparingly soluble precious metal compounds. One or more organic carboxylic acids and/or salts thereof are then added to the suspension. The precipitated precious metal compounds are subsequently reduced by chemical means. The catalyst formed in this way is washed until free of chloride, dried and, if appropriate, subsequently calcined at a temperature in the range from 300 to 1000° C. under an inert or reducing atmosphere.

The suspension of support material, hexachloroplatinic (IV) acid and ruthenium(III) chloride is strongly acidic. Addition of an alkali metal hydroxide, preferably sodium hydroxide, results in the precious metal compounds being hydrolysed and precipitated in the form of sparingly soluble hydroxidic compounds and deposited on the support material. Addition of a reducing agent, for example formaldehyde or hydrazine, effects chemical reduction of the precipitated precious metal compounds. The quality of the reduction is significantly improved by addition of one or more inorganic carboxylic acids or salts thereof to the suspension before addition of the reducing agent. Suitable carboxylic acids which exert the positive effect observed are all aliphatic and aromatic carboxylic acids, for example tartaric acid, phthalic acid, acetic acid, citric acid and their alkali metal salts.

Reducing agents used are the customary chemical reducing agents such as formaldehyde, hydrazine, sodium borohydride or comparable compounds.

The atomic ratio of platinum:ruthenium in the catalysts of the invention is typically in the range from 4:1 to 1:4, preferably in the range from 2:1 to 1:2. The precious metals platinum and ruthenium can be present in alloyed form, partially alloyed form or unalloyed form (i.e. as bimetallic mixtures). Depending on the choice of the preparative conditions, the precious metal can be in oxidized form and/or may comprise varying amounts of surface oxides (Pt oxides, Ru oxides).

A critical factor in achieving the high catalytic effectiveness of the catalysts is their high precious metal loading (i.e. their high precious metal content) in the range from 80 to 98 wt. %, preferably from 85 to 98 wt. %, of PtRu, particularly preferably from 85 to 95 wt. % of PtRu (based on the total weight of the catalyst), with the precious metal particles at the same time having a mean particle size (XRD) of less than 3 nm.

As a parameter for the degree of dispersion of the electrocatalysts of the present invention, the specific surface area (BET) of the electrocatalyst is determined. It was found that, in the case of high-loading electrocatalysts, the value of the specific surface area is a good indicator for the surface area of the precious metal particles, since the surface of the carbon black support material is nearly completely covered by the precious metal particles. Generally, the specific surface area (BET) values of the electrocatalysts of the present invention are the range from 100 to 160 m$^2$/g, preferably in the range from 105 to 150 m$^2$/g, thus indicating a high catalytically active precious metal surface area ("dispersion").

The measurement of the specific surface area of the carbon-based support material and the electrocatalysts prepared according to this invention is carried out by the BET standard method in accordance with DIN 66 132.

The determination of the mean particle size is carried out by means of X-ray diffraction (XRD). As powder diffractometer, use is made of an instrument from Stoe Co., Darmstadt (Germany), and copper K$_\alpha$-radiation is employed. Calculation is carried out by means of the Scherrer equation.

The determination of the layer thicknesses of electrode layers is carried out by means of a light section microscope, by evaluation of micrographs of polished sections, or with the aid of a micrometer screw, in each case after drying of the layers.

It has been found that particularly thin, homogeneous electrode layers which at the same time have a high loading of precious metal per unit area (i.e. mg of PtRu per cm$^2$ of electrode area) can be produced by use of the high-loading supported PtRu/C catalysts. Such thin layers which at the same time have a high catalyst concentration result in reduced mass transfer losses and lower electric losses in the anode of the DMFC. The PtRu catalysts of the invention therefore lead to a further significant increase in the power of the DMFC.

Thus, for example, in the case of the 95 wt. % PtRu/C catalyst, the thickness of the anode catalyst layer is in the region of 65 μm whereas the catalyst concentration (i.e. the PtRu loading per unit area) of the anode is in a high region of about 8.6 mg PtRu/cm$^2$.

The provision of the high-loading PtRu/C catalysts of the invention thus makes it possible to produce thin, homogeneous and therefore highly effective catalyst layers. Layers having thicknesses of less than 80 µm and a high precious metal loading can also be produced using conventional PtRu blacks, but compared to these layers the layers produced using the catalysts of the invention have the advantage of lower roughness and better homogeneity. Owing to their agglomerated particles, PtRu blacks tend to form very rough, nonuniform layers.

The high-loading PtRu/C catalysts of the invention are produced essentially according to the process described in EP 1 260 269 A1. Alterations and modifications are indicated in the following examples.

The electrode layers are produced using catalyst inks with the aid of conventional coating methods (e.g. screen printing). Earlier patent applications or patents of the applicant (e.g. DE 103 25 324.6, EP 1 176 652, EP 1 037 295) are hereby incorporated by reference.

The following examples illustrate the invention.

EXAMPLES

Example 1

PtRu/C Electrocatalyst (Loading: 90 wt. % PtRu/C)

1250 ml of deionized water are placed in a 300 ml glass beaker. 2.3 g of carbon black (Black Pearls 2000, specific surface area (BET): 1500 m$^2$/g; Cabot, USA) are then added, the suspension is stirred for 30 minutes and heated to 80° C. 39.8 g of a 25% strength aqueous hexachloroplatinic(IV) acid solution and 46.9 g of a 22% strength aqueous ruthenium(III) chloride solution are combined in a glass beaker, transferred to a 500 ml dropping funnel and diluted to 375 ml. The precious metal solution is added to the carbon black suspension over a period of 20 minutes while stirring. The solution is subsequently set to a pH of 7 by means of 10% strength NaOH. 400 ml of a 0.1 molar potassium hydrogen phthalate solution are then added. The pH is then 4.8. 63 ml of a 24% strength hydrazine solution are then added over a period of about 3 minutes and the mixture is stirred at 80° C. for another 30 minutes. The suspension is filtered hot and the solid is washed with 800 ml of deionized water. The filtercake is dried overnight at 65° C. in a vacuum drying oven. This gives 28.6 g of a catalyst which has the following properties:

| Composition: | 90 wt. % of PtRu, |
| --- | --- |
| | 10 wt. % of carbon black |
| Pt/Ru atomic ratio: | 1:1 |
| Mean particle size (XRD): | <2 nm |
| Catalyst surface area (BET): | 143 m$^2$/g |

The PtRu/C supported catalyst prepared in this way is processed with addition of a solution of Nafion® (10% in water, DuPont, USA) to give an ink and applied a number of times to an anode gas diffusion layer (SGL-Sigracet 30, SGL, Meitingen; format: 7.5×7.5 cm). The ink is dried (conditions: 80° C., 10 min) between each of the coating steps. The loading of precious metal per unit area is 9.8 mg of PtRu/cm$^2$. The layer thickness of the catalyst layer is about 80 µm. The anode is processed further using a Nafion® 115 membrane (from DuPont) and a cathode electrode (Pt loading per unit area: 1.5 mg of Pt/cm$^2$) to produce an MEU and tested in a DMFC test stand.

Test conditions: Cell format: 50 cm$^2$, cell temperature: 70° C., 1 M MeOH solution, flow: 3 ml/min; cathode: air, stoichiometry: 2.5.

Result: A cell voltage of 428 mV is obtained at a current density of 250 mA/cm$^2$. This corresponds to a very good peak power density of 107 mW/cm$^2$.

Example 2

PtRu/C Electrocatalyst (Loading: 90 wt. % PtRu/C)

1250 ml of deionized water are placed in a 3000 ml glass beaker. 2.3 g of carbon black (Ketjenblack EC 600, specific surface area (BET): 1270 m$^2$/g; AKZO-Nobel, Amersfoort, The Netherlands) are then added, the suspension is stirred for 30 minutes and heated to 80° C. 39.8 g of a 25% strength aqueous hexachloroplatinic(IV) acid solution and 48.7 g of a 21.15% strength aqueous ruthenium(III) chloride solution are combined in a glass beaker, transferred to a 500 ml dropping funnel and diluted to 375 ml. The precious metal solution is added to the carbon black suspension over a period of 20 minutes while stirring. The solution is subsequently set to a pH of 7 by means of 10% strength NaOH. 338 ml of a 0.1 molar potassium hydrogen phthalate solution are then added. The pH is then 4.8. 63 ml of a 24% strength hydrazine solution are then added over a period of about 3 minutes and the mixture is stirred at 80° C. for another 30 minutes. The suspension is filtered hot and the solid is washed with 800 ml of deionized water. The filtercake is dried overnight at 65° C. in a vacuum drying oven. This gives 28.6 g of a catalyst which has the following properties:

| Composition: | 90 wt. % of PtRu, |
| --- | --- |
| | 10 wt. % of carbon black |
| Pt/Ru atomic ratio: | 1:2 |
| Mean particle size (XRD): | 2.2 nm |
| Catalyst surface area (BET): | 134 m$^2$/g |

The catalyst displays a very good peak power density in the DMFC.

Example 3

PtRu/C Electrocatalyst (Loading: 95 wt. % PtRu/C)

1250 ml of deionized water are placed in a 3000 ml glass beaker. 1.15 g of carbon black (Black Pearls 2000, specific surface area (BET): 1500 m$^2$/g; Cabot, USA) are then added, the suspension is stirred for 30 minutes and heated to 80° C. 56.3 g of a 25% strength aqueous hexachloroplatinic(IV) acid solution and 33.2 g of a 22% strength aqueous ruthenium(III) chloride solution are combined in a glass beaker, transferred to a 500 ml dropping funnel and diluted to 375 ml. The precious metal solution is added to the carbon black suspension over a period of 20 minutes while stirring. The solution is subsequently set to a pH of 7 by means of 10% strength NaOH. 400 ml of a 0.1 molar sodium hydrogen tartrate solution are then added. The pH is then 4.8. 63 ml of a 24% strength hydrazine solution are then added over a period of about 3 minutes and the mixture is stirred at 80° C. for another 30 minutes. The suspension is filtered hot and washed with 800 ml of deionized water. The filtercake is dried overnight at 65° C. in a vacuum drying oven. This gives 27.4 g of a catalyst which has the following properties:

| Composition: | 95 wt. % of PtRu, |
| --- | --- |
| | 5 wt. % of carbon black |
| Pt/Ru atomic ratio: | 1:1 |
| Mean particle size (XRD): | 2.5 nm |
| Catalyst surface area (BET): | 107 m$^2$/g |

The PtRu/C supported catalyst prepared in this way is processed with addition of a solution of Nafion® (10% in water, DuPont) to give an ink and applied a number of times by means of screen printing to an anode gas diffusion layer (Sigracet 30, SGL, Meitingen; format: 7.5×7.5 cm). The ink is dried (conditions: 80° C., 10 min) between each of the printing steps. The loading of precious metal per unit area is finally 6.4 mg of PtRu/cm². The layer thickness of the catalyst layer is 65 µm. The anode is processed further using a Nafion® 115 membrane (from DuPont) and a cathode electrode (Pt loading per unit area: 1.5 mg of Pt/cm²) to produce an MEU and tested in a DMFC test stand.

Test conditions: Cell format: 50 cm², cell temperature: 70° C., 1 M MeOH solution, flow: 3 ml/min; cathode: air, stoichiometry: 2.5.

Result: A cell voltage of 421.5 mV is obtained at a current density of 250 mA/cm². This corresponds to a very good peak power density of 105.4 mW/cm².

Comparative Example 1 (CE 1)

PtRu/C Electrocatalyst (Loading: 60 wt. % PtRu/C, Prior Art)

The preparation of the PtRu electrocatalyst is carried out as described in Example 1. The carbon black used is Vulcan XC 72 (BET surface area: 250 m²/g, Cabot Inc., USA) and the corresponding proportions of carbon black are increased. 9 g of carbon black (Vulcan XC 72) are used. Furthermore, 53.4 g of a 25% strength aqueous hexachloroplatinic(IV) acid solution and 31.4 g of a 22% strength aqueous ruthenium(III) chloride solution are used. The other process steps are described in Example 1.

| Composition: | 60 wt. % of PtRu, 40 wt. % of carbon black |
|---|---|
| Pt/Ru atomic ratio: | 1:1 |
| Mean particle size (XRD): | 4.1 nm |
| Catalyst surface area (BET): | 95.5 m²/g |

The PtRu/C supported catalyst prepared in this way is processed with addition of a solution of Nafion® to give an ink and applied a number of times to an anode gas diffusion layer (GDL type SGL-Sigracet 30, format: 7.5×7.5 cm). The ink is dried after the coating steps. The PtRu loading per unit area is about 2.25 mg of PtRu/cm². The layer thickness of the anode layer is about 60 µm. The anode is processed further using a Nafion® 115 membrane and a cathode electrode (Pt loading per unit area: 1.5 mg of Pt/cm²) to produce an MEU and tested in a DMFC test stand.

Test conditions: Cell format: 50 cm², cell temperature: 70° C., 1 M MeOH solution, flow: 3 ml/min; cathode: air, stoichiometry: 2.5.

Result: A cell voltage of 270 mV is obtained at a current density of 250 mA/cm². This corresponds to a peak power density of 70 mW/cm², which is significantly below that obtained using the catalysts of the invention.

Comparative Example 2 (CE 2)

Platinum-Rutheniium Black (Unsupported, Prior Art)

An unsupported PtRu black is prepared as described in Example 1, except that the addition of carbon black as support material is omitted. 1250 ml of deionized water are placed in a 3000 ml glass beaker and heated to 80° C. The Pt- and Ru-containing precious metal solution is added over a period of 20 minutes while stirring and a pH of 7 is subsequently set by means of 10% strength NaOH. 398 ml of a 0.1 molar potassium hydrogen phthalate solution are then added. The pH is then 4.8. 63 ml of a 24% strength hydrazine solution are then added over a period of about 3 minutes and the mixture is stirred at 80° C. for another 30 minutes. The suspension is filtered hot and the solid is washed with 800 ml of deionized water. The filtercake is dried overnight at 65° C. in a vacuum drying oven. This gives 28.4 g of a platinum-ruthenium black which has the following properties:

| Composition: | about 100 wt. % of PtRu |
|---|---|
| Pt/Ru atomic ratio: | 1:1 |
| Particle size (XRD): | 4.5 nm |
| Catalyst surface area (BET): | 64 m²/g |

The PtRu black prepared in this way is processed with addition of a solution of Nafion® to give an ink and applied to an anode gas diffusion layer (GDL type SGL-Sigracet 30, format: 7.5×7.5 cm). The ink is subsequently dried. The loading of precious metal per unit area is 7.75 mg of PtRu/cm². The catalyst layer is rough and nonuniform. The anode is processed further using a Nafion® 115 membrane and a cathode electrode (Pt loading per unit area: 1.5 mg of Pt/cm²) to produce an MEU and tested in a DMFC test stand.

Test conditions: Cell format: 50 cm², cell temperature: 70° C., 1 M MeOH solution, flow: 3 ml/min; cathode: air, stoichiometry: 2.5.

Result: A cell voltage of 319.5 mV is obtained at a current density of 250 mA/cm². This corresponds to a peak power density of 79.9 mW/cm², which is significantly below that obtained using the catalysts of the invention.

The invention claimed is:

1. Platinum/ruthenium catalyst for the anodic oxidation of methanol in direct methanol fuel cells, the catalyst comprising particles of platinum and ruthenium, wherein the platinum/ruthenium content is in the range from 85 to 98 wt. % based on the total weight of the catalyst on a carbon-based support material and wherein the mean particle size of the particles of the platinum/ruthenium as measured by XRD method is less than 3 nm.

2. Platinum/ruthenium catalyst according to claim 1, wherein the platinum/ruthenium content is in the range from 85 to 95 wt. % based on the total weight of the catalyst on a carbon-based support material.

3. Platinum/ruthenium catalyst according to claim 1, wherein the carbon-based support material is electrically conductive and comprises carbon black, furnace black, graphitized carbon black, graphite, activated carbon, carbon nanoparticles or mixtures or combinations thereof.

4. Platinum/ruthenium catalyst according to claim 1, wherein the specific surface area measured by BET method of the carbon-based support material is in the range from 1000 to 2000 m²/g.

5. Platinum/ruthenium catalyst according to claim 1, wherein the specific surface area measured by BET method of the catalyst is in the range from 100 to 160 m²/g.

6. Platinum/ruthenium catalyst according to claim 1, wherein the atomic ratio of platinum:ruthenium is in the range from 4:1 to 1:4.

7. Platinum/ruthenium catalyst according to claim 1, wherein the precious metals platinum and/or ruthenium are present in alloyed form, partially alloyed form, unalloyed form, oxidized form or partially oxidized form.

8. Process for preparing a platinum/ruthenium catalyst according to claim 1, in which the carbon-based support material is suspended in water, the suspension is heated to up to the boiling point while stirring continually and solutions of hexachloroplatinic(IV) acid and ruthenium(III) chloride are then introduced into the suspension at the same temperature and while continuing to stir, the pH of the suspension is subsequently increased to a value in the range from 6.5 to 10 by addition of an alkali metal hydroxide to precipitate hexachloroplatinic(IV) acid and ruthenium(III) chloride in the form of sparingly soluble precious metal compounds, one or more organic carboxylic acids and/or salts thereof are then added to the suspension, the precipitated precious metal compounds are chemically reduced by addition of a reducing agent and the catalyst formed in this way is washed, dried and, if appropriate, calcined at a temperature of from 300 to 1000° C. under an inert or reducing atmosphere, characterized in that the carbon-based support material has a specific surface area measured by BET method in the range from 1000 to 2000 $m^2/g$.

9. Process for preparing a platinum/ruthenium catalyst according to claim 8, wherein the organic carboxylic acid is an aliphatic or aromatic carboxylic acid.

10. Process for preparing a platinum/ruthenium catalyst according to claim 8, wherein the chemical reduction is effected by addition of formaldehyde, hydrazine, sodium borohydride or comparable reducing agents.

11. Process for preparing a platinum/ruthenium catalyst according to claim 8, in which the carbon-based support material is suspended in water, the suspension is heated to up to the boiling point while stirring continually and solutions of hexachloroplatinic(IV) acid and ruthenium(III) chloride are then introduced into the suspension at the same temperature and while continuing to stir, the pH of the suspension is subsequently increased to a value in the range from 6.5 to 10 by addition of an alkali metal hydroxide to precipitate hexachloroplatinic(IV) acid and ruthenium(III) chloride in the form of sparingly soluble precious metal compounds, one or more organic carboxylic acids and/or salts thereof are then added to the suspension, the precipitated precious metal compounds are chemically reduced by addition of a reducing agent and the catalyst formed in this way is washed, dried and, if appropriate, calcined at a temperature of from 300 to 1000° C. under an inert or reducing atmosphere, characterized in that the carbon-based support material has a specific surface area measured by BET method in the range from 1200 to 1600 $m^2/g$.

12. Process for preparing a platinum/ruthenium catalyst according to claim 8, wherein the organic carboxylic acid is a member selected from the group consisting of tartaric acid, phthalic acid, acetic acid, citric acid and alkali metal salts thereof.

13. Platinum/ruthenium catalyst according to claim 1, wherein the specific surface area measured by BET method of the carbon-based support material is in the range from 1200 to 1600 $m^2/g$.

14. Platinum/ruthenium catalyst according to claim 1, wherein the specific surface area measured by BET method of the catalyst is in the range from 105 to 150 $m^2/g$.

15. Platinum/ruthenium catalyst according to claim 1, wherein the atomic ratio of platinum:ruthenium is in the range from 2:1 to 1:2.

16. Electrode for the anodic oxidation of methanol in direct methanol fuel cells which comprises a platinum/ruthenium catalyst having a platinum/ruthenium content in the range from 85 to 98 wt. % based on the total weight of the catalyst on a carbon-based support material, wherein the PtRu loading per unit area of the electrode layer is in the range from 6 to 12 mg of PtRu/$cm^2$ and the layer thickness of the electrode layer after drying is less than 80 μm.

17. Membrane-electrode unit for direct methanol fuel cells which comprises the electrode according to claim 16.

18. A platinum/ruthenium catalyst for the anodic oxidation of methanol in direct methanol fuel cells, the catalyst comprising platinum and ruthenium particles on a carbon-based support material, wherein:
   a) the catalyst comprises from 85 to 98 wt. % of the platinum/ruthenium content based on the total weight of the catalyst on the carbon-based support material;
   b) the mean particle size of particles of the platinum/ruthenium as measured by XRD method is less than 3 nm;
   c) the carbon-based support material is electrically conductive and comprises carbon black, furnace black, graphitized carbon black, graphite, activated carbon, carbon nanoparticles or mixtures or combinations thereof;
   d) the specific surface area measured by BET method of the carbon-based support material is in the range from 1200 to 1600 $m^2/g$;
   e) the specific surface area measured by BET method of the catalyst is in the range from 100 to 160 $m^2/g$;
   f) the atomic ratio of platinum:ruthenium is in the range from 4:1 to 1:4; and
   g) the platinum and/or ruthenium are present in alloyed form, partially alloyed form, unalloyed form, oxidized form or partially oxidized form.

* * * * *